(12) United States Patent
Ying

(10) Patent No.: US 10,477,253 B2
(45) Date of Patent: Nov. 12, 2019

(54) METHOD AND APPARATUS FOR DETECTING VIDEO PLAYABILITY

(71) Applicant: Tencent Technology (Shenzhen) Company Limited, Shenzhen, Guangdong (CN)

(72) Inventor: Yulong Ying, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 92 days.

(21) Appl. No.: 15/707,613

(22) Filed: Sep. 18, 2017

(65) Prior Publication Data

US 2018/0007399 A1 Jan. 4, 2018

Related U.S. Application Data

(63) Continuation of application No. PCT/CN2016/102606, filed on Oct. 19, 2016.

(30) Foreign Application Priority Data

Dec. 10, 2015 (CN) .......................... 2015 1 0909480

(51) Int. Cl.
*H04N 21/234* (2011.01)
*H04N 19/91* (2014.01)
(Continued)

(52) U.S. Cl.
CPC .......... *H04N 21/234* (2013.01); *H04H 20/57* (2013.01); *H04H 40/27* (2013.01); *H04N 19/91* (2014.11);
(Continued)

(58) Field of Classification Search
USPC .................................................. 709/231, 219
See application file for complete search history.

(56) References Cited

U.S. PATENT DOCUMENTS 8,893,203 B2 * 11/2014 O'Hanlon .............. G11B 27/10
725/112
10,250,940 B2 * 4/2019 Ashoori ........... H04N 21/44008
(Continued)

FOREIGN PATENT DOCUMENTS

| CN | 101796834 A | 8/2010 |
| CN | 103501468 A | 1/2014 |

(Continued)

OTHER PUBLICATIONS

International Search Report with English translation, dated Jan. 25, 2017, pp. 1-5, issued in International Application No. PCT/CN2016/102606, State Intellectual Property Office of the P.R. China, Beijing, China.

(Continued)

*Primary Examiner* — Jude Jean Gilles
(74) *Attorney, Agent, or Firm* — Brinks Gilson & Lione

(57) ABSTRACT

System and methods related to video information distribution are provided. The system may obtain a video source address. The system may receive a video segment of a video stream from a remote server configured with the video source address. The system may parse the video segment for header information. The system may determine that a video corresponding to the video source address is playable on a remote device in response to the header information being included in the video segment. The system may store the video source address in a database. The database may include a plurality video addresses corresponding to respective videos that are playable on the remote device.

18 Claims, 4 Drawing Sheets

(51) Int. Cl.
    *H04H 20/57*     (2008.01)
    *H04H 40/27*     (2008.01)
    *H04N 21/2383*     (2011.01)
    *H04N 21/226*     (2011.01)
    *H04N 21/462*     (2011.01)
    *H04N 21/84*     (2011.01)
    *H04N 21/414*     (2011.01)
    *H04N 21/438*     (2011.01)

(52) U.S. Cl.
    CPC ..... *H04N 21/2265* (2013.01); *H04N 21/2383* (2013.01); *H04N 21/23418* (2013.01); *H04N 21/4622* (2013.01); *H04N 21/84* (2013.01); *H04N 21/41407* (2013.01); *H04N 21/4382* (2013.01)

(56) References Cited

U.S. PATENT DOCUMENTS

| | | | | |
|---|---|---|---|---|
| 2004/0013403 A1* | 1/2004 | Asada | ............... | G11B 27/034 386/279 |
| 2006/0095527 A1* | 5/2006 | Malik | ............... | G06Q 10/107 709/206 |
| 2006/0222328 A1* | 10/2006 | Akahane | ............... | G11B 27/105 386/232 |
| 2007/0077023 A1* | 4/2007 | Okuyama | ............ | G11B 27/036 386/283 |
| 2008/0088706 A1* | 4/2008 | Girgensohn | ........... | H04N 5/247 348/207.99 |
| 2012/0093235 A1 | 4/2012 | Suh et al. | | |
| 2014/0215517 A1* | 7/2014 | Kuo | ................... | H04N 21/4622 725/41 |
| 2015/0095957 A1* | 4/2015 | Ravi | ................ | H04N 21/41407 725/87 |
| 2016/0127440 A1* | 5/2016 | Gordon | ........... | H04N 21/23439 709/219 |

FOREIGN PATENT DOCUMENTS

| | | |
|---|---|---|
| CN | 104661058 A | 5/2015 |
| CN | 104980805 A | 10/2015 |
| CN | 105516734 A | 4/2016 |

OTHER PUBLICATIONS

Office Action dated Feb. 2, 2019 for Chinese Application No. 201510909480.8, 7 pages.

* cited by examiner

METHOD AND APPARATUS FOR DETECTING VIDEO PLAYABILITY

RELATED APPLICATION

This application is a continuation of International Application PCT/CN2016/102606, filed on Oct. 19, 2016, which claims priority to Chinese Patent Application No. 201510909480.8, entitled "Method and apparatus for detecting video playing possibility", filed on Dec. 10, 2015, both of which are incorporated herein by reference in their entireties.

FIELD OF THE TECHNOLOGY

The present disclosure relates to video information processing technologies and, in particular, to accessing and distributing video information over distributed networks.

BACKGROUND OF THE DISCLOSURE

As network environment is continuously upgraded, and performance of mobile devices is continuously improved, watching videos on a mobile device becomes a first choice of most users.

Historically, a main traffic source of a video website relies on a search engine. However, in a mobile Internet era, a video application itself is a traffic entrance. To contend for video users, video websites may launch their own video clients. These clients may have various different video content. If a user wants to view the various different video content, multiple video clients may increase the difficulty of managing these video clients by the user. Moreover, present approaches to video distribution suffer from a variety of drawbacks limitations, disadvantages, and inefficiencies. There is a need for the inventive methods, systems, and apparatuses described herein.

SUMMARY

The system, apparatuses, and methods described herein may provide for detecting video playability, so as to resolve a technical problem of relatively low stability of video playing in an aggregated video application. Alternatively or in addition, one of the technical advancements provided by the system, methods, and apparatuses described herein may be that the stability of playing video streams from multiple distributed sources on a network is increased. Additional technical advantages are made apparent in the embodiments described below.

An embodiment of the present disclosure provides a method for detecting video playability, including:

obtaining a video source address;

obtaining a first video stream according to the video source address, the first video stream being a partial video stream in a second video stream corresponding to the video source address;

determining whether header information of the second video stream can be parsed out from the first video stream;

determining that a video corresponding to the video source address is playable if the header information of the second video stream can be parsed out from the first video stream; and determining that a video corresponding to the video source address is unplayable if the header information of the second video stream cannot be parsed out from the first video stream.

Correspondingly, an embodiment of the present disclosure further provides an apparatus for detecting video playability, including:

an address obtaining module, configured to obtain a video source address;

a video stream obtaining module, configured to obtain a first video stream according to the video source address, the first video stream being a partial video stream in a second video stream corresponding to the video source address; and a determining module, configured to: determine whether header information of the second video stream can be parsed out from the first video stream; determine that a video corresponding to the video source address is playable if the header information of the second video stream can be parsed out from the first video stream; and determine that a video corresponding to the video source address is unplayable if the header information of the second video stream cannot be parsed out from the first video stream.

The method for detecting video playability in the embodiments of the present disclosure includes: obtaining a video source address; obtaining a first video stream according to the video source address, the first video stream being a partial video stream in a second video stream corresponding to the video source address; determining whether header information of the second video stream can be parsed out from the first video stream; determining that a video corresponding to the video source address is playable if the header information of the second video stream can be parsed out from the first video stream; and determining that a video corresponding to the video source address is unplayable if the header information of the second video stream cannot be parsed out from the first video stream. In the solution, playability of a video corresponding to the video source address may be detected by using a parsing result of the header information of the video stream. Therefore, in the solution, playability of a video source in a third-party video website used in an aggregated video application may be detected, thereby avoiding that the aggregated video application uses the video source address corresponding to the unplayable video and improving stability of video playing of the aggregated video application.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DESCRIPTION OF EMBODIMENTS

The following describes the example embodiments and technical solutions provided by the example embodiments with reference to the accompanying drawings. While various embodiments are described herein, it will be apparent to those of ordinary skill in the art that many more embodiments and implementations are possible. Accordingly, the embodiments described herein are examples, not the only possible embodiments and implementations.

In one example, an implementation solution of the aggregated video application servers in communication with the aggregated video application may include: using a video source address of a third-party video website in the aggregated video application, to play a video. Specifically, first, a video source is searched for on a network, and then, the extracted video source address is sniffed, so that a user can directly select and view the video source in the video application. In this solution, although operating costs are very low, and content is updated very fast, a playing address of a third-party video source used in the video application may get invalid at anytime, causing low stability of video playing.

As can be known from the above, because a video source address of a third-party video website is used in an aggregated video application, and the video source address of the third-party video website may become invalid at anytime, a technical problem of relatively low stability of video playing may exist.

In some examples, the embodiments described herein provide a method, logic, and/or an apparatus related to detecting video playability and/or improve low stability of video playing. Detailed descriptions are provided below.

Figure 1:
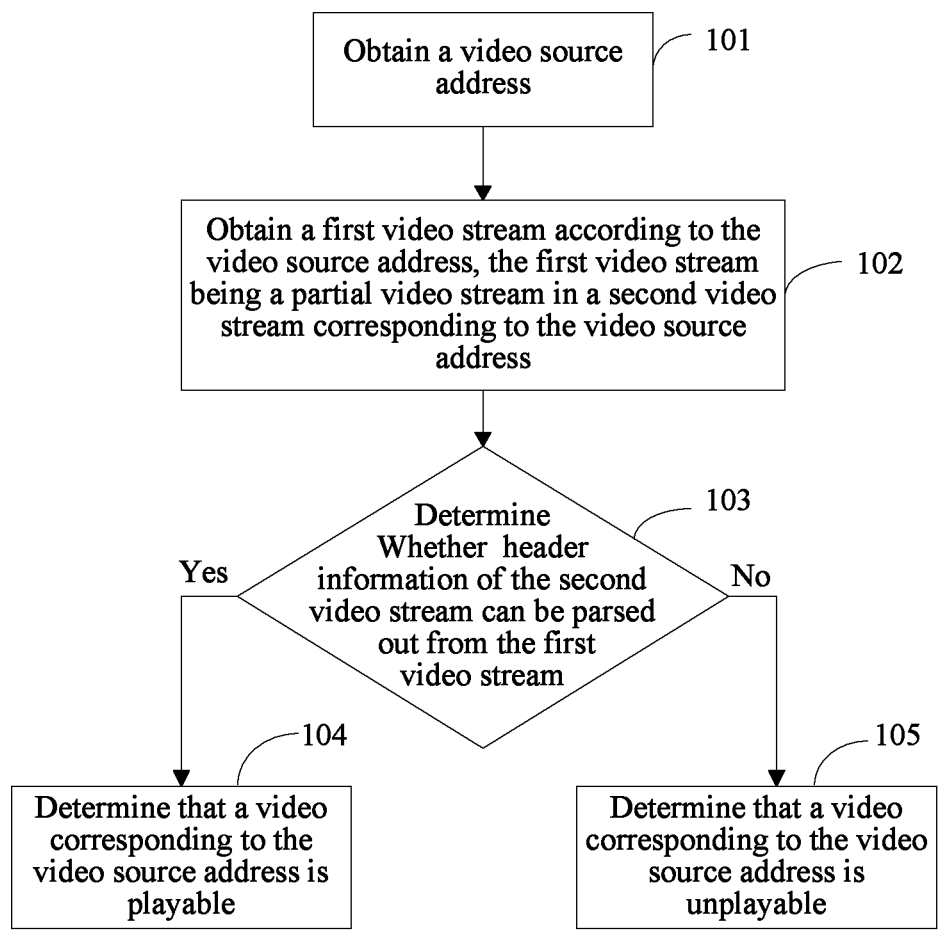
FIG. 1 illustrates a first example of a flow diagram for logic of a system.

FIG. 1 illustrates a first example of a flow diagram for logic of a system 400. This embodiment provides a method for detecting video playability. The detection method and/or logic may be performed by an apparatus for detecting video playability. The detection apparatus may be integrated in a server, such as a background server of an aggregated video application. As shown in FIG. 1, the detection method or logic may include:

Step 101: Obtain a video source address.

Specifically, the server obtains the video source address. The video source address may be a uniform resource locator (URL) of a network video, or the like.

There are multiple manners for obtaining the video source address in this embodiment. For example, a video web page may be obtained from a network, and the video web page is parsed, to obtain a video source address corresponding to a video network. In other words, the logic may include accessing a web page from a network; and parsing the web page to identify the video source address included in the web page. Alternatively or in addition, the detection method in this embodiment may be applied to a process of adding the video source address to the aggregated video application and is used for detecting playability of a video of the newly added video source address. In an actual application, a background server of the aggregated video application may crawl the video web page from the network, and parse the video web page, to obtain the corresponding video source address. For example, the background server continuously crawls the video web page from the network by using a web page crawler, and parses the crawled video web page to obtain the corresponding video source address. In other words, the logic may include repeatedly accessing a plurality of web pages over a regular time interval; parsing each of the web pages for video source addresses; and/or identifying the video source address based on the parsing.

In one example, the step of "parsing the video web page, to obtain the video source address corresponding to the video web page" may specifically include: parsing the video web page, to obtain a video tag corresponding to the video web page; and obtaining, according to the video tag, the video source address corresponding to the video web page. Alternatively or in addition, the logic may include extracting, from the header information, video length information, video encoding format information, and video frame rate information. In some examples the logic may verify presence of video length information, video encoding format information, and video frame rate information.

The step of "obtaining, according to the video tag, the video source address corresponding to the video web page" may include: processing the video tag by executing a js script of the video web page, and obtaining the video source address from the processed video tag. For example, the background server may parse the video web page by using a browser kernel service, to obtain the video tag. Then, the background server may execute the js script of the video web page by using a browser content service, so as to process the video tag, and finally, extract a video url from the processed video tag. Alternatively or in addition, the logic may include parsing the web page for a video tag included in the web page. The video tag may be associated with video information included in the web page. The video tag may be indicative of a location of the video information in the web page. The video information may include the video source address. The logic may further include extracting, from the video information, the video source address;

In this embodiment, in addition to the foregoing introduced manner, a manner for obtaining the video source address may also be obtaining an existing video source address in the aggregated video application, and specifically may be obtaining a video source address saved by the background server of the aggregated video application. In this case, the detection method in this embodiment is used for detecting playability of a video of the video source address in the aggregated video application.

Step 102: Obtain a first video stream according to the video source address, the first video stream being a partial video stream in a second video stream corresponding to the video source address. In other words, the logic may include receiving a video segment of a video stream from a remote server configured with the video source address. The video segment may include a packet for the video stream. Alternatively or in addition, the video segment may include a frame of the video stream. In some examples, the video segment may include a predefined number of frames and/or packets. The video stream may include a live stream from a remote server. In other examples, the video stream may include video information pre-stored on the remote server.

The remote server may include any server that stores or provides video. The remote server may store the video. Alternatively or in addition, the remote server may receive the video from a source. The remote server may include a network endpoint that provides the video stream over a network. The remote server may be located on the network at the video source address. Alternatively or in addition, the remote server may provide services, such as video streaming services, that provide the video stream on the network at the video source address. The video source address may include an IP address, a port number, or any other type of computer or network address.

The background server may receive video from the remote server. Alternatively or in addition, the remote server may provide a web page that the background server may access. The web page may include the video source address. For example, the video source address may be located in and/or adjacent to a tag on the web page. Alternatively or in addition, the web page may include a link that includes the video source address.

Specifically, the first video stream is downloaded from the network according to the video source address. The first video stream is a partial video stream in an entire video stream, that is, the second video stream, corresponding to the video source address. Preferrably, the first video stream is a video stream at a header part of the second video stream.

For example, the background server of the aggregated video application downloads a partial video stream from a video server according to the video source address and caches the partial video stream.

Step 103: Determine whether header information of the second video stream can be parsed out from the first video stream; perform step 104 if the header information of the second video stream can be parsed out from the first video stream; perform step 105 if the header information of the second video stream cannot be parsed out from the first video stream. In other words, the logic may include verification of a presence of the video header information.

Specifically, the background server parses the first video stream, to obtain the header information of the second video stream. If parsing succeeds, it indicates that the background server can parse out the header information from the first video stream. If parsing fails, it indicates that the background server cannot parse out the header information from the first video stream.

The header information of the second video stream includes: video length information, video encoding format information, video frame rate information, and the like.

Step 104: Determine that a video corresponding to the video source address is playable.

When the background server determines that the header information can be parsed out from the first video stream, it indicates that the video source address is valid. In this case, it can be determined that the video corresponding to the video source address is playable. In some examples, the logic may include determining that the video stream is playable in response to identification of the header information in the video stream.

A video stream may be playable when the header information is present in the video stream. In some examples, the video stream may be playable when a device may is compatible with the video stream. For example, the video stream may follow a one or more standards, such as 4K, MPEG, and/or any other streaming standard. The video stream may be parsed based on predefined video information that describes video standards that a device is compatible with. The predefined video information may include video length information, video encoding format information, video frame rate information, and/or any other information descriptive of the type of video that may play on the device. In some examples, the background server may obtain the predefined video information and parse the video stream for information contained in the predefined video information. For example, the device may communicate the predefined video information to the background server and the background server may store the predefined video information in the database.

In other examples, the video stream may be playable when the video stream is present and/or not corrupt. For example, logic may include determining that the video stream is not corrupt in response to the header information being included in the video stream. Alternatively or in addition, the logic may determine that the video stream is corrupt in response to the header information not being included in the video stream.

Step 105: Determine that a video corresponding to the video source address is unplayable.

When the background server determines that the header information cannot be parsed out from the first video stream, it indicates that the video source address gets invalid. In this case, it can be determined that a video corresponding to the video source address is unplayable.

When the method in this embodiment is applied to video detection on the newly added video source address, after it is determined that a video corresponding to the video source address is playable, the detection method in this embodiment may further include: adding the video source address to the aggregated video application, specifically, storing the video source address in the background server of the aggregated video application, and generating video information (such as a video web page) according to the video source address. After the video source address is added to the aggregated video application, the video information may be sent to a user terminal. For example, the user terminal sends a video information request to the background server, and the background server sends the video information to the terminal. In some examples, the video information request may include the video source address.

In an actual application, after the background server adds the video source address to the aggregated video application, if the user sends a video request to the background server by using a browser or a video client, the background server sends the video information generated according to the video source address to a terminal browser or a terminal video client. For example, in a process of adding the video source address, if the background server detects that a video of a particular video source address is playable, the background server adds the video source address to a database of the aggregated video application. Then, the background server generates video information according to the video source address. When the user views video options provided by the browser, the background server sends the video information to a browser of the terminal for display, for the user to select and watch the video.

When the detection method in this embodiment is used for performing playability detection on a video of the existing video source address in the aggregated video application, that is, when step 101 includes: obtaining a to-be-detected video source address in the aggregated video application, after it is determined that a video corresponding to the video source address is unplayable, the detection method in this embodiment may further include: deleting the video source address from the aggregated video application, and may specifically include: deleting the video source address from a storage of the background server of the aggregated video application. For example, the video source address is deleted from a database of the aggregated video application. Further, the video information corresponding to the existing video source address may further be deleted, to update video information in the aggregated video application.

In some examples, the database on the background server may store identifying information related to a remote device. The background server may associate the identifying information with one or more video source address. The video source address may be playable and/or compatible with the video device. For example, the background server may have previously determined that the video corresponding to the video source address is compatible with the video device based on the header information of the video stream corresponding to the video. The background server may associate, in the database, the one or more video source addresses with the remote device in response to the video corresponding to the one or more video source addresses being compatible with and/or playable on the device.

As can be known from the above, this embodiment of the present disclosure includes: obtaining a video source address; obtaining a first video stream according to the video source address, the first video stream being a partial video stream in a second video stream corresponding to the video source address; determining whether header information of the second video stream can be parsed out from the first video stream; determining that a video corresponding to the video source address is playable if the header information of the second video stream can be parsed out from the first video stream; and determining that a video corresponding to the video source address is unplayable if the header information of the second video stream cannot be parsed out from the first video stream. In the solution, playability of a video corresponding to the video source address may be detected by using a parsing result of the header information of the video stream. Therefore, in the solution, playability of a video source in a third-party video website used in an aggregated video application may be detected, thereby avoiding that the aggregated video application uses the video source address corresponding to the unplayable video, improving stability of video playing of the aggregated video application, and improving user experience. In addition, in this embodiment of the present disclosure, a valid video source address may be added to an aggregated video application, and an invalid video source address may be deleted from the aggregated video application, so as to update video content of the aggregated video application in time. In addition, the solution of this embodiment may reduce operating costs of the aggregated video application and accelerate update of the video content.

Figure 2:
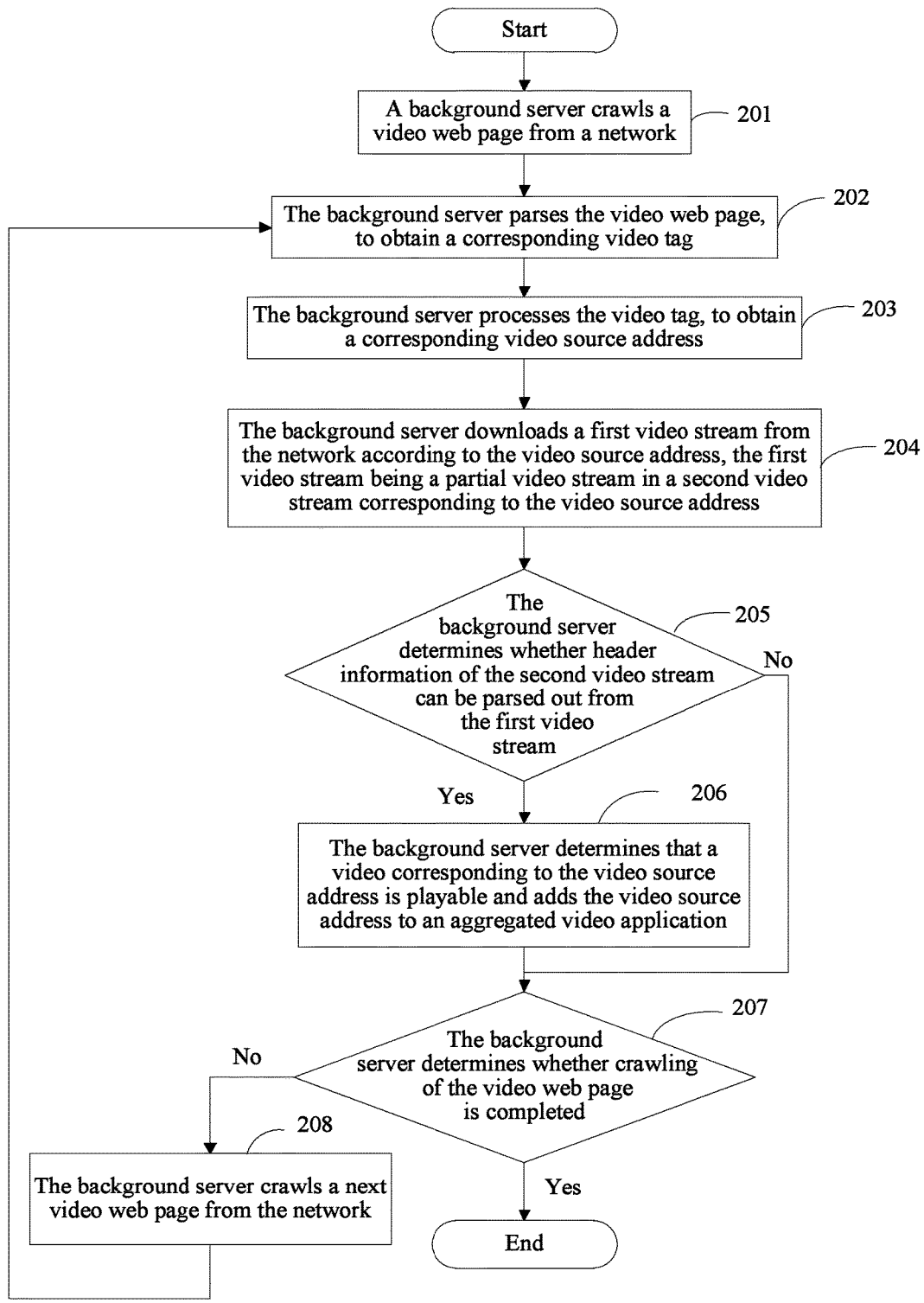
FIG. 2 illustrates a second example of a flow diagram for logic of a system.

FIG. 2 illustrates a second example of a flow diagram for logic of the system 400. According to the description herein, further detailed descriptions are provided below by using examples.

In a description of this embodiment, for example, a detection apparatus may be specifically integrated in a background server of an aggregated video application, and the detection apparatus is applied to a scenario in which a video source address is added to the aggregated video application and/or a database. The database may be accessible by the aggregated video application. The database may include multiple video addresses corresponding to respective videos that are playable on a remote device.

There are multiple manners for integrating the detection apparatus in the background server, for example, integrating the detection apparatus in the background server in a combination of a software form and a hardware form.

Referring in FIG. 2, an example process or logic may be as follows:

Step 201: A background server crawls a video web page from a network.

Specifically, the background server continuously crawls the video web page from the network by installing a web page crawling program, for example, crawls a video web page of an online website by using the web page crawling program.

Step 202: The background server parses the video web page, to obtain a corresponding video tag.

Specifically, the background server may parse the crawled video web page by using a browser kernel service, to obtain the video tag. The video tag includes: video title information, video source address information, and the like.

Step 203: The background server processes the video tag, to obtain a corresponding video source address.

Generally, the video source address information in the video tag is incomplete or a part of the video source address is hidden. Therefore, the video tag needs to be processed, to obtain a complete video source address.

Specifically, the background server may execute a js script in the video web page by using the browser kernel service, to process the video source address information in the video tag and pretend to obtain the video source address. Alternatively or in addition, the logic may include logic to download a web page. The web page may include instructions to access the video stream. The instructions to access the video stream may include JavaScript® or any other example of scripted language embedded in a web-page. The logic may include logic to may execute the instructions to access the video stream. In addition, the logic may include logic to extract, from the video stream, the video source address.

In other examples, logic may include logic to crawl a website for a predefined tag. The predefined tag may be associated with and/or include video information. For example, the predefine may identify a location of the video information in the web page. The logic may include logic to extract the video information in response to identification of the video tag. In addition, the logic may include logic to parse the video information to identify the video source address.

Step 204: The background server downloads a first video stream from the network according to the video source address, the first video stream being a partial video stream in a second video stream corresponding to the video source address.

Specifically, the background server may send a video stream obtaining request to a corresponding video server according to the video source address, and receive a partial video stream that is returned by the video server according to the video stream obtaining request. The partial video stream is a partial video stream of an entire video stream corresponding to the video source address in the video server. In other words, the logic may include receiving a video segment of a video stream from a remote server configured with the video source address.

In an actual application, the background server may also cache the first video stream.

Step 205: The background server determines whether header information of the second video stream can be parsed out from the first video stream; perform step 206 if the header information of the second video stream can be parsed out from the first video stream; perform step 207 if the header information of the second video stream cannot be parsed out from the first video stream.

Specifically, the background server first parses the first video stream to obtain the header information. If parsing succeeds, it is considered that the header information of the second video stream can be parsed out from the first video stream. If parsing fails, it is considered that the header information of the second video stream cannot be parsed out from the first video stream. In an actual application, the background server parses the cached first video stream to obtain the header information.

Step 206: The background server determines that a video corresponding to the video source address is playable and adds the video source address to an aggregated video application and/or a database. The database may be accessible to the aggregated video application and/or a video playback application on a remote device. The aggregated video application, in some examples, may execute on a remote device. The remote device may communicate with the background server a network.

The background server may add the video source address to a database accessible to the aggregated video application. Specifically, the background server adds the video source address to a database of the aggregated video application and generates corresponding video information according to the video source address, for example, generates a video web page and the like.

Step 207: The background server determines whether crawling of the video web page is completed; perform step 208 if crawling of the video web page is not completed; end the process if crawling of the video web page is completed.

After the background server determines that the header information cannot be parsed out, the video source address may be discarded, and the step of determining whether crawling of the video web page is completed is performed.

Step 208: The background server crawls a next video web page from the network, and return to step 202.

As can be known from the above, this embodiment of the present disclosure includes: crawling a video web page from a network; processing the video web page by means of parsing, to obtain a video source address; obtaining a first video stream according to the video source address, the first video stream being a partial video stream in a second video stream corresponding to the video source address; determining whether header information of the second video stream can be parsed out from the first video stream; determining that a video corresponding to the video source address is playable and adding the video source address to an aggregated video application if the header information of the second video stream can be parsed out from the first video stream; determining that a video corresponding to the video source address is unplayable and skipping performing an adding operation if the header information of the second video stream cannot be parsed out from the first video stream. In this solution, playability of the video corresponding to the video source address may be detected by using a parsing result of the header information of the video stream; the video source address of the playable video is added, and an adding operation is not performed on the video source address of the unplayable video. Therefore, in this solution, it may be avoided that the aggregated video application uses the video source address corresponding to the unplayable video, thereby improving stability of video playing of the aggregated video application and improving user experience. In addition, in this embodiment of the present disclosure, a valid video source address may be added to the aggregated video application, so as to update video content of the aggregated video application in real time. In addition, the solution of this embodiment may also reduce operating costs of the aggregated video application and accelerate update of the video content.

Figure 3:
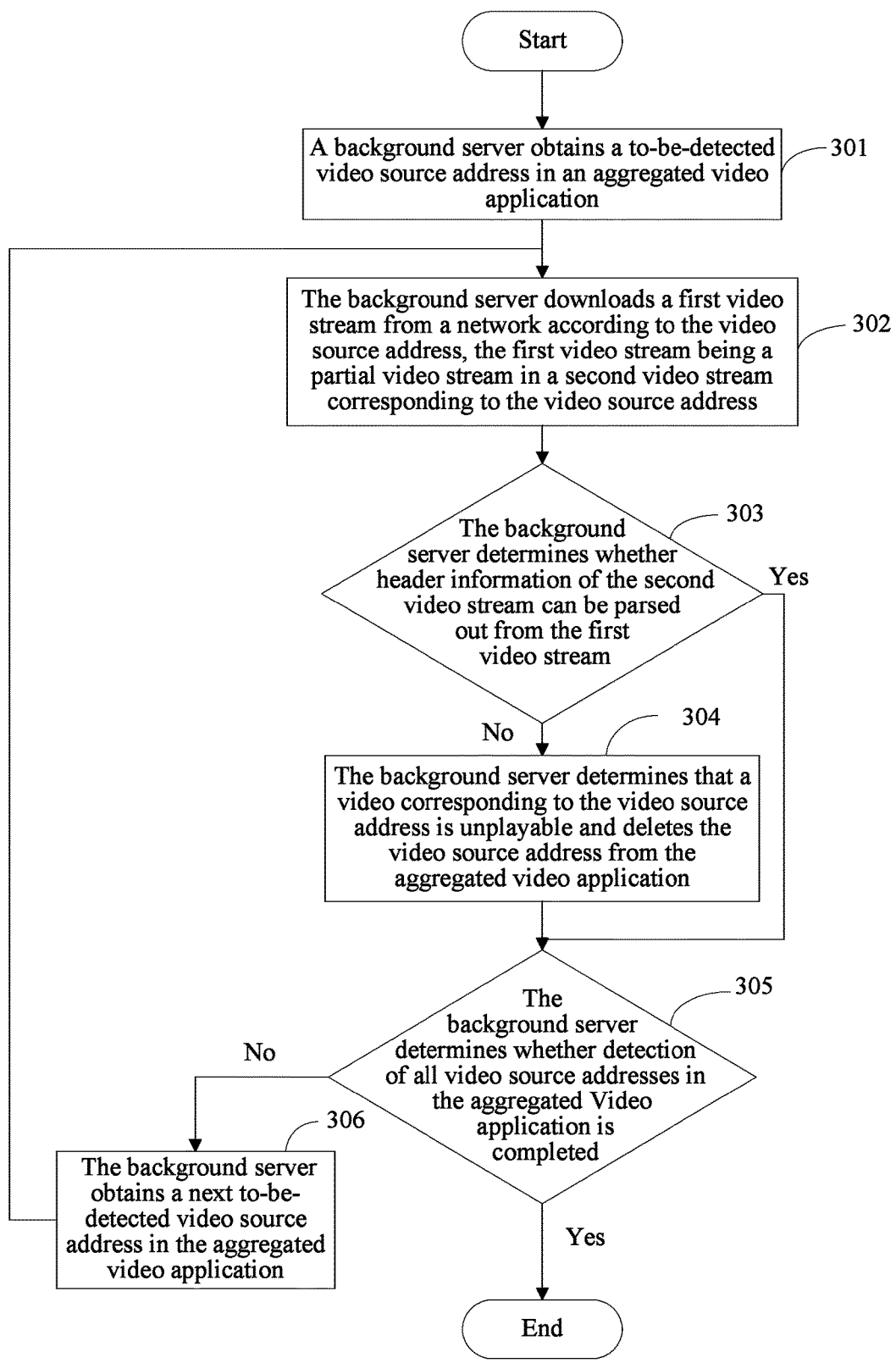
FIG. 3 illustrates a third example of a flow diagram for logic of a system.

FIG. 3 illustrates a third example of a flow diagram for logic of the system 400. According to the description herein, further detailed descriptions are provided below by using examples.

In a description of this embodiment, for example, a detection apparatus may be specifically integrated in a background server of an aggregated video application, and the detection apparatus is applied to detect adding of an existing video source address of the aggregated video application.

There are multiple manners for integrating the detection apparatus in the background server, for example, integrating the detection apparatus in the background server in a combination of software and hardware.

Referring to FIG. 3 a specific process or logic is as follows:

Step 301: A background server obtains a to-be-detected video source address in the aggregated video application. In other words, the logic may include identifying, in a database, a previously the video source address. The video source address may be pre-stored.

Specifically, when the background server performs traversing to detect all video sources in the aggregated video application, the background server may extract to-be-detected video source addresses in the aggregated video application one by one according to a predetermined sequence. Alternatively or in addition, the server may extract one or more video source addresses corresponding to the most frequently accessed video source addresses. In some examples, the logic may include accessing the video source address this has become stale. For example, the logic may include accessing the video source address after a predetermined time threshold has elapsed.

Step 302: The background server downloads a first video stream from a network according to the video source address, the first video stream being a partial video stream in a second video stream corresponding to the video source address.

Specifically, the background server may send a video stream obtaining request to a corresponding video server according to the video source address, and receive a partial video stream that is returned by the video server according to the video stream obtaining request. The partial video stream is a partial video stream of an entire video stream corresponding to the video source address in the video server.

In an actual application, the background server may also cache the first video stream.

Step 303: The background server determines whether header information of the second video stream can be parsed out from the first video stream; perform step 304 if the header information of the second video stream cannot be parsed out from the first video stream; perform step 305 if the header information of the second video stream can be parsed out from the first video stream.

Specifically, the background server first parses the first video stream to obtain the header information. If parsing succeeds, it is considered that the header information of the second video stream can be parsed out from the first video stream. If parsing fails, it is considered that the header information of the second video stream cannot be parsed out from the first video stream. In an actual application, the background server parses the cached first video stream to obtain the header information.

Step 304: The background server determines that a video corresponding to the video source address is unplayable and deletes the video source address from the aggregated video application.

Specifically, the background server deletes the video source address from a database of the aggregated video application.

Step 305: The background server determines whether detection of all video source addresses in the aggregated video application is completed; perform step 306 if the detection is not completed; end the process if the detection is completed.

Step 306: The background server obtains a next to-be-detected video source address in the aggregated video application, and return to step 302.

As can be known from the above, this embodiment of the present disclosure includes: obtaining a video source address in an aggregated video application; obtaining a first video stream according to the video source address, the first video stream being a partial video stream in a second video stream corresponding to the video source address; determining whether header information of the second video stream can be parsed out from the first video stream; determining that a video corresponding to the video source address is playable if the header information of the second video stream can be parsed out from the first video stream; and determining that a video corresponding to the video source address is unplayable and deleting the video source address if the header information of the second video stream cannot be parsed out from the first video stream. In the solution, playability of a video corresponding to the video source address in the aggregated video application may be detected by using a parsing result of the header information of the video stream, and the video source address of the unplayable video is deleted. Therefore, the solution can avoid a problem that the video is unplayable because the existing video source address of the aggregated video application gets invalid, thereby improving stability of video playing of the aggregated video application and improving user experience.

Figure 4:
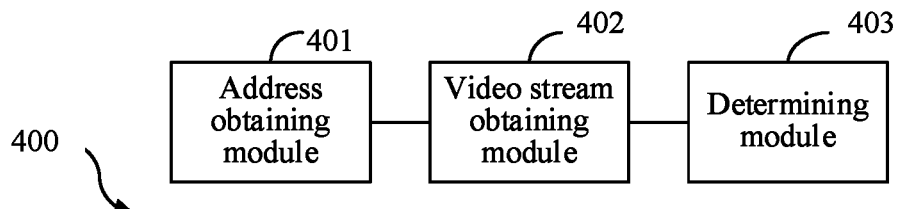
FIG. 4 illustrates a first example of a system.

FIG. 4 illustrates a first example of the system 400. To better implement the foregoing solution, this embodiment of the present disclosure further provides an apparatus for detecting video playability. As shown in FIG. 4, the detection apparatus may include: an address obtaining module 401, a video stream obtaining module 402, and a determining module 403.

The address obtaining module 401 is configured to obtain a video source address.

The video stream obtaining module 402 is configured to obtain a first video stream according to the video source address, the first video stream being a partial video stream in a second video stream corresponding to the video source address.

The determining module 403 is configured to: determine whether header information of the second video stream can be parsed out from the first video stream; determine that a video corresponding to the video source address is playable if the header information of the second video stream can be parsed out from the first video stream; and determine that a video corresponding to the video source address is unplayable if the header information of the second video stream cannot be parsed out from the first video stream.

Preferably, the header information includes: video length information, video encoding format information, video frame rate information, and the like.

Preferably, the address obtaining module 401 is specifically configured to:

obtain a video web page from a network; and parse the video web page, to obtain the video source address corresponding to the video web page.

Further, the address obtaining module 401 is specifically configured to:

obtain a video web page from a network; and parse the video web page, to obtain a video tag corresponding to the video web page; and obtain, according to the video tag, the video source address corresponding to the video web page.

Figure 5:
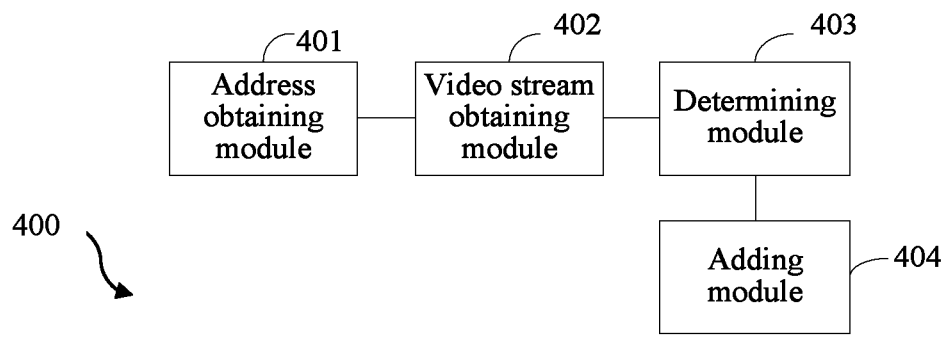
FIG. 5 illustrates a second example of a system.

Preferably, as shown in FIG. 5, the detection apparatus of this embodiment may further include an adding module 404. The adding module 404 is configured to: add the video source address to an aggregated video application after the determining module 403 determines that the video corresponding to the video source address is playable.

Figure 6:
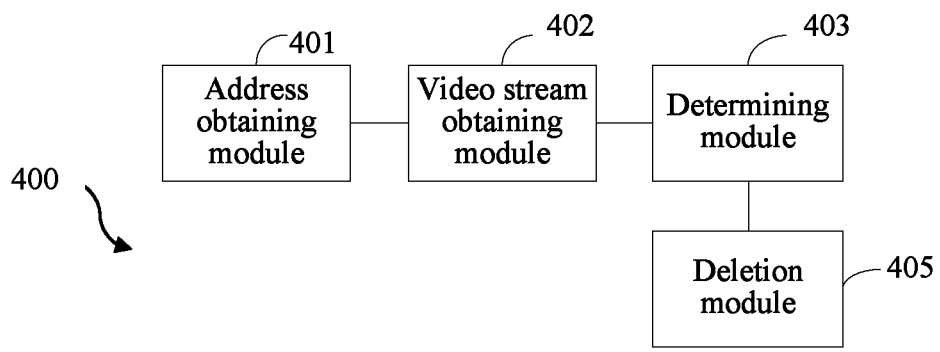
FIG. 6 illustrates a third example of a system.

Preferably, the address obtaining module 401 may be specifically configured to obtain a to-be-detected video source address in the aggregated video application. In this case, as shown in FIG. 6, the detection apparatus of this embodiment may further include a deletion module 405. The deletion module 405 is configured to: delete the video source address from the aggregated video application after the determining module 403 determines that the video corresponding to the video source address is unplayable.

During specific implementation, the foregoing modules may be implemented as independent entities or may be randomly combined as a same entity or several entities for implementation. For specific implementations of the foregoing modules, refer to the foregoing method embodiments. Details are not provided herein again.

As can be known from the above, in the apparatus for detecting video playability in this embodiment of the present disclosure, the address obtaining module 401 obtains a video source address; the video stream obtaining module 402 obtains a first video stream according to the video source address, the first video stream being a partial video stream in a second video stream corresponding to the video source address; and the determining module 403 determines whether header information of the second video stream can be parsed out from the first video stream, determines that a video corresponding to the video source address is playable if the header information of the second video stream can be parsed out from the first video stream, and determines that a video corresponding to the video source address is unplayable if the header information of the second video stream cannot be parsed out from the first video stream. In the solution, playability of a video corresponding to the video source address may be detected by using a parsing result of the header information of the video stream. Therefore, in the solution, playability of a video source in a third-party video website used in an aggregated video application may be detected, thereby avoiding that the aggregated video application uses the video source address corresponding to the unplayable video, improving stability of video playing of the aggregated video application, and improving user experience. In addition, in this embodiment of the present disclosure, a valid video source address may be added to an aggregated video application, and an invalid video source address may be deleted from the aggregated video application, so as to update video content of the aggregated video application in time. In addition, the solution of this embodiment may reduce operating costs of the aggregated video application and accelerate update of the video content.

FIG. 5 illustrates a second example of the system 400. This embodiment of the present disclosure further provides a server, and the server may be any device in a computer terminal group.

Optionally, in this embodiment, the server may include one or more processors, a memory, and a transmission apparatus.

The memory may be configured to store a software program and a module. The processor runs the software program and the module stored in the memory, to implement various functional application and data processing, that is, perform the foregoing method for detecting video playability. The memory may include a high-speed random access memory, and may also include a nonvolatile memory, for example, one or more magnetic storage devices, flash memories, or other nonvolatile solid-state memories. In some examples, the memory may further include memories remotely disposed relative to the processor, and these remote memories may be connected to the server through a network.

Optionally, the processor may execute program code of the following steps in the method for detecting video playability:

Step S1: Obtain a video source address.

Step S2: Obtain a first video stream according to the video source address, the first video stream being a partial video stream in a second video stream corresponding to the video source address.

Step S3: Determine whether header information of the second video stream can be parsed out from the first video stream; determine that a video corresponding to the video source address is playable if the header information of the second video stream can be parsed out from the first video stream; and determine that a video corresponding to the video source address is unplayable if the header information of the second video stream cannot be parsed out from the first video stream.

Optionally, the processor may further execute program code of the following steps in the method for detecting video playability: obtaining a video web page from a network; and parsing the video web page, to obtain the video source address corresponding to the video web page.

Optionally, the processor may further execute program code of the following steps in the method for detecting video playability: parsing the video web page, to obtain a video tag corresponding to the video web page; and obtaining, according to the video tag, the video source address corresponding to the video web page.

Optionally, the processor may further execute program code of the following steps in the method for detecting video playability: adding the video source address to an aggregated video application after determining that the video corresponding to the video source address is playable.

Optionally, the processor may further execute program code of the following steps in the method for detecting video playability: obtaining a to-be-detected video source address in the aggregated video application.

Optionally, the processor may further execute program code of the following steps in the method for detecting video playability: deleting the video source address from the aggregated video application after determining that the video corresponding to the video source address is unplayable.

A person of ordinary skill in the art may understand that the server may also be a terminal device such as a smartphone (such as an Android phone and an iOS phone), a tablet computer, a palmtop computer, mobile internet devices (MID), and a PAD.

A person of ordinary skill in the art may understand that all or some of the steps of the methods in the foregoing embodiments may be implemented by a program instructing relevant hardware. The program may be stored in a computer readable storage medium, and the storage medium may include: a flash memory, a read-only memory (ROM), a random access memory (RAM), a magnetic disk, an optical disc, or the like.

FIG. 6 illustrates a third example of the system 400. This embodiment of this application further provides a storage medium. Optionally, in this embodiment, the storage medium may be configured to store program code executed in the method for detecting video playability provided in other described examples.

Optionally, in this embodiment, the storage medium may be located in any server of a server group in a computer network or located in any mobile terminal of a mobile terminal group.

Optionally, in this embodiment, the storage medium is configured to store program code used for performing the following steps:

Step S4: Obtain a video source address.

Step S5: Obtain a first video stream according to the video source address, the first video stream being a partial video stream in a second video stream corresponding to the video source address.

Step S6: Determine whether header information of the second video stream can be parsed out from the first video stream; determine that a video corresponding to the video source address is playable if the header information of the second video stream can be parsed out from the first video stream; and determine that a video corresponding to the video source address is unplayable if the header information of the second video stream cannot be parsed out from the first video stream.

Optionally, in this embodiment, the storage medium is configured to store program code used for performing the following step: obtaining a video web page from a network; and parsing the video web page, to obtain the video source address corresponding to the video web page.

Optionally, in this embodiment, the storage medium is configured to store program code used for performing the following step: parsing the video web page, to obtain a video tag corresponding to the video web page; and obtaining, according to the video tag, the video source address corresponding to the video web page.

Optionally, in this embodiment, the storage medium is configured to store program code used for performing the following step: adding the video source address to an aggregated video application after determining that the video corresponding to the video source address is playable.

Optionally, in this embodiment, the storage medium is configured to store program code used for performing the following step: obtaining a to-be-detected video source address in the aggregated video application.

Optionally, in this embodiment, the storage medium is configured to store program code used for performing the following step: deleting the video source address from the aggregated video application after determining that the video corresponding to the video source address is unplayable.

The system 400 may be implemented with additional, different, or fewer components than illustrated. For example, the system 400 may include a memory and a processor.

The processor may be in communication with the memory. In one example, the processor may also be in communication with additional elements, such as a network interface (not shown). Examples of the processor may include a general processor, a central processing unit, a microcontroller, a server, an application specific integrated circuit (ASIC), a digital signal processor, a field programmable gate array (FPGA), and/or a digital circuit, analog circuit.

The processor may be one or more devices operable to execute logic. The logic may include computer executable instructions or computer code embodied in the memory or in other memory that when executed by the processor, cause the processor to perform the features implemented by the logic of the address obtaining module, the video streaming module, the determining module, the adding module, and/or the deletion module. The computer code may include instructions executable with the processor.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device.

The memory may include at least one of obtaining module, the video streaming module, the determining module, the adding module, and/or the deletion module.

Each component may include additional, different, or fewer components. The system 400 may be implemented in many different ways. Each module, such as the obtaining module, the video streaming module, the determining module, the adding module, and/or the deletion module, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory, for example, that comprises instructions executable with the processor or other processor to implement one or more of the features of the module. When any one of the module includes the portion of the memory that comprises instructions executable with the processor, the module may or may not include the processor. In some examples, each module may just be the portion of the memory or other physical memory that comprises instructions executable with the processor or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system 400 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable storage medium, such as a CD-ROM, a volatile memory, a non-volatile memory, ROM, RAM, or any other suitable storage device.

The processing capability of the system 400 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, ... or N including any one element alone or the one element in combination with one or more of the other elements which may also include, in combination, additional elements not listed.

A person of ordinary skill in the art may understand that all or some of the steps of the methods in the foregoing embodiments may be implemented by a program instructing relevant hardware. The program may be stored in a computer readable storage medium, and the storage medium may include: a read-only memory (ROM), a random access memory (RAM), a magnetic disk, an optical disc, or the like.

The method and the apparatus for detecting video playability provided in the embodiments of the present disclosure are introduced above in detail. Although the principles and implementations of the present disclosure are described by using specific examples, the descriptions of the embodiments are only intended to help understand the method and core ideas of the present disclosure. Meanwhile, a person skilled in the art may make modifications to the specific implementations and application scopes according to the ideas of the present disclosure. In conclusion, the content of the specification should not be construed as a limitation to the present disclosure.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A method for detecting video playability, comprising:
obtaining a video source address;
obtaining a first video stream according to the video source address, the first video stream being a partial video stream in a second video stream corresponding to the video source address;
determining whether header information of the second video stream can be parsed out from the first video stream;
determining that a video corresponding to the video source address is playable if the header information of the second video stream can be parsed out from the first video stream; and
determining that a video corresponding to the video source address is unplayable if the header information of the second video stream cannot be parsed out from the first video stream.

2. The detection aspect according to aspect 1, wherein the header information comprises: video length information, video encoding format information, and video frame rate information.

3. The detection aspect according to any of aspect 1 to 2, wherein
the step of obtaining a video source address specifically comprises:
obtaining a video web page from a network; and
parsing the video web page, to obtain the video source address corresponding to the video web page.

4. The detection aspect according to any of aspects 1 to 3, wherein the step of parsing the video web page, to obtain the video source address corresponding to the video web page specifically comprises:
parsing the video web page, to obtain a video tag corresponding to the video web page; and
obtaining, according to the video tag, the video source address corresponding to the video web page.

5. The detection aspect according to any of aspects 1 to 4, after the determining that a video corresponding to the video source address is playable, further comprising: adding the video source address to an aggregated video application.

6. The detection aspect according to any of aspects 1 to 5, wherein
the step of obtaining a video source address specifically comprises:
obtaining a to-be-detected video source address in the aggregated video application.

7. The detection aspect according to any of aspects 1 to 6, wherein after the determining that a video corresponding to the video source address is unplayable, the detection method further comprises: deleting the video source address from the aggregated video application.

8. An apparatus for detecting video playability, comprising:
an address obtaining module, configured to obtain a video source address;
a video stream obtaining module, configured to obtain a first video stream according to the video source address, the first video stream being a partial video stream in a second video stream corresponding to the video source address; and
a determining module, configured to: determine whether header information of the second video stream can be parsed out from the first video stream; determine that a video corresponding to the video source address is playable if the header information of the second video stream can be parsed out from the first video stream; and determine that a video corresponding to the video source address is unplayable if the header information of the second video stream cannot be parsed out from the first video stream.

9. The detection apparatus according to aspect 8, wherein the header information comprises: video length information, video encoding format information, and video frame rate information.

10. The detection apparatus according to any of aspects 1 to 9, wherein the address obtaining module is specifically configured to:
obtain a video web page from a network; and
parse the video web page, to obtain the video source address corresponding to the video web page.

11. The detection apparatus according to any of aspects 1 to 10, further comprising: an adding module, wherein
the adding module is configured to: add the video source address to an aggregated video application after the determining module determines that the video corresponding to the video source address is playable.

12. The detection apparatus according to any of aspects 1 to 11, further comprising: a deletion module, wherein
the address obtaining module is specifically configured to obtain a to-be-detected video source address in the aggregated video application; and
the deletion module is configured to: delete the video source address from the aggregated video application after the determining module determines that the video corresponding to the video source address is unplayable.

The system and methods described herein may include additional or alternative aspects. For example, embodiments of the present invention disclose a method and an apparatus for detecting video playability. The method for detecting video playability in the embodiments of the present invention includes: obtaining a video source address; obtaining a first video stream according to the video source address, the first video stream being a partial video stream in a second video stream corresponding to the video source address; determining whether header information of the second video stream can be parsed out from the first video stream; determining that a video corresponding to the video source address is playable if the header information of the second video stream can be parsed out from the first video stream; and determining that a video corresponding to the video source address is unplayable if the header information of the second video stream cannot be parsed out from the first video stream. In the solution, playability of a video source in a third-party video website used in the aggregated video application may be detected, thereby avoiding that the aggregated video application uses the video source address corresponding to the unplayable video and improving stability of video playing of the aggregated video application.

What is claimed is:

1. A computer-implemented method, comprising:
obtaining, by a processor of a background server, a video source address;
receiving, by the processor, a first video stream and a second video stream from a remote server identified by the video source address, the first video stream being a partial video stream of the second video stream;
parsing, by the processor, a video segment of the second video stream to identify header information for the first video stream;
determining, by the processor, that the first video stream is playable on a remote device in response to the header information including predetermined video information associated with the remote device;
storing, by the processor, a link between the video source address and the remote device in a database in response to determination that the first video stream is playable on the remote device;
receiving a video information request from the remote device before the remote device accesses the video source address; and
communicating, to the remote device, the video source address in response to the video information request and in response the link between the video source address and the remote device being stored in the database.

2. The computer-implemented method of claim 1, wherein determining that the first video stream is playable further comprises
verifying a presence of at least one of video length information, video encoding format information, and video frame rate information in the video segment.

3. The computer-implemented method of claim 1, wherein the step of obtaining the video source address further comprises:
accessing a web page from a network; and
parsing the web page to identify the video source address in the web page.

4. The computer-implemented method of claim 3, wherein the step of parsing the web page further comprises:
parsing the web page for a video tag, the video tag associated with video information included in the web page, the video tag indicative of a location of the video information in the web page, the video information comprising the video source address; and
extracting, from the video information, the video source address.

5. The computer-implemented method of claim 1, wherein obtaining the video information request comprises the video source address.

6. The computer-implemented method of claim 1, further comprising:

determining, by the processor, that the first video stream is not playable on the remote device in response the header information not being present in the first video stream; and
removing, from the database, the video source address in response to determining that the first video stream is not playable on the remote device.

7. An apparatus for detecting video playability, comprising:
a processor, the processor configured to:
obtain a video source address;
receive a first video stream and a second video stream from a remote server configured with the video source address, the first video stream being a partial video stream of the second video stream;
parse a video segment of the second video stream for header information;
determine that a video corresponding to the video source address is playable on a remote device in response to the header information being included in the video segment;
store a link between the video source address and the remote device in a database in response to determination that the video is playable on the remote device, the database comprising a plurality of video source addresses corresponding to respective videos that are playable on the remote device;
receive a video information request from the remote device; and
communicate, to the remote device, the video source address in response to the video information request and in response the link between the video source address and the remote device being stored in the database.

8. The apparatus of claim 7, wherein to determine that the video corresponding to the video source address is playable, the processor is further configured to:
verify presence of video length information, video encoding format information, and video frame rate information.

9. The apparatus of claim 7, wherein the processor is further configured to:
download a web page from a network; and
parse the web page for the video source address.

10. The apparatus of claim 7, wherein to store the video source address, the processor is further configured to:
add the video source address to the database, the database accessible by a video playback application on the remote device.

11. The apparatus of claim 7, wherein
the video information request comprises the video source address.

12. The apparatus of claim 7, wherein to obtain the video source address, the processor is further configured to:
parse a web page for a predefined tag, the predefined tag associated with video information included in the web page;
extract the video information in response to identification of the predefined tag; and
parse the video information to identify the video source address.

13. The apparatus of claim 7, wherein to obtain the video source address, the processor is further configured to:
download a web page, the web page comprising instructions to access the second video stream;
execute the instructions to access the second video stream; and extract, from the second video stream, the video source address.

14. A non-transitory computer readable storage medium, comprising: a plurality of instructions executable by a processor, the instructions including:
  instructions executable by the processor to obtain a video source address;
  instructions executable by the processor to receive a first video stream and a second video stream from a video server configured with the video source address, the first video stream being a partial video stream of the second video stream; and
  instructions executable by the processor to parse a video segment of the second video stream for header information of the first video stream;
  instructions executable by the processor to determine that a video corresponding to the video source address is playable on a remote device in response to the header information being included in the video segment;
  instructions executable by the processor to store a link between the video source address and an identifier of the remote device in a database, the database comprising a plurality video source addresses corresponding to video streams that are playable on the remote device, the database accessible by a video playback application on the remote device;
  instructions executable by the processor to receive a video information request created by the remote device; and
  instructions executable by the processor to communicate the video source address to the remote device, in response to the link between the video source address and the identifier of the remote device being stored in the database.

15. The non-transitory computer readable storage medium of claim 14, further comprising:
  instructions executable by the processor to determine that the video corresponding to the video source address is not playable on the remote device in response to the header information not being included in the video segment; and
  instructions executable by the processor to remove, from the database, the video source address.

16. The non-transitory computer readable storage medium of claim 14, wherein the instructions executable to receive the video segment further comprise:
  instructions executable by the processor to send a request to the video server; and
  instructions executable by the processor to cache the video segment in response to receipt of the video segment.

17. The non-transitory computer readable storage medium of claim 14, further comprising:
  instructions executable by the processor to download a web page, the web page comprising a script to access the second video stream from the video server;
  instructions executable to access the second video stream in accordance with the script; and
  instructions executable to receive the video source address from the video server.

18. The non-transitory computer readable storage medium of claim 14, wherein the instructions executable to determine that a video corresponding to the video source address is playable further comprise instructions executable by the processor to:
  verify presence of at least one of video length information, video encoding format information, and video frame rate information in the video segment.

* * * * *